United States Patent

[11] 3,588,245

[72] Inventors Donald R. Herriott
 Morris Township, Morris County;
 Eric G. Rawson, Murray Hill, N.J.
[21] Appl. No. 764,185
[22] Filed Oct. 1, 1968
[45] Patented June 28, 1971
[73] Assignee Bell Telephone Laboratories, Incorporated
 Murray Hill, N.J.

[54] ADJUSTABLE COMPENSATION IN OPTICAL SYSTEMS
 15 Claims, 5 Drawing Figs.
[52] U.S. Cl. .................................................. 355/71,
 350/166
[51] Int. Cl. ..................................................... G03b 27/76

[50] Field of Search ............................................ 355/71;
 350/166

[56] References Cited
UNITED STATES PATENTS
3,090,281 5/1963 Marechal et al. ............. 355/71

*Primary Examiner*—Samuel S. Matthews
*Assistant Examiner*—Richard A. Wintercorn
*Attorneys*—R. J. Guenther and Arthur J. Torsiglieri ABSTRACT: A plurality of lenses are arranged along an optic axis through which light of a substantially single frequency is directed. A spherical interference filter is located symmetrically on the optical axis and is capable of being moved axially or tilted in order to give nonuniform light transmission to compensate for a light intensity gradient created by the plurality of lenses. Other filter configurations are also described.

INVENTORS: D.R. HERRIOTT
E.G. RAWSON

BY

*Robert B. Anderson*

ATTORNEY

3,588,245

1
ADJUSTABLE COMPENSATION IN OPTICAL SYSTEMS

BACKGROUND OF THE INVENTION

An important step in the fabrication of semiconductor devices and integrated circuits is to print on a photosensitive film overlaying a semiconductor substrate a physically small, and in many cases highly complex, mask pattern which defines at least part of the structure to be fabricated. Systems which are the optical equivalent of photographic reduction cameras are typically used both for making the photolithographic masks and for projecting the mask pattern onto the semiconductor substrate. Because of the fine detail which eventually must be reproduced, a high premium is placed on resolution and uniformity of photographic exposure.

One problem frequently encountered is the tendency of conventional lens elements to transmit projected light nonuniformly. More explicitly, conventional lenses tend to attenuate light as a function of distance from the center of the lens such that light rays passing through the lens near its edge are attenuated more than are light rays passing through the center of the lens, thus giving rise to an undesired light intensity gradient in the plane transverse to the optic axis. As a result, details near the edge of a printed pattern are exposed to a lesser degree than those near the center, which constitutes a condition known in the art as vignetting.

SUMMARY OF THE INVENTION

In accordance with one embodiment of the invention, compensation for undesired light intensity gradients to reduce or eliminate vignetting may be made by including in the optic system an interference filter formed on a curved surface. As is known, an interference filter is a device which attenuates light as a function of frequency and will transmit light only within a specified frequency pass-band. Because such filters operate on the principle of constructive interference, attenuation at a particular frequency is a function of the angle of light impingement on the filter. Impingement angle, as used herein, means the angle a ray makes with a surface, which is 90° minus the angle of incidence.

The filter is designed such that its maximum transmission frequency at a normal impingement angle is slightly lower than the light source frequency. With this provision, as will be explained later, light impinging at either an acute or an obtuse angle will be transmitted with less attenuation than light impinging at a normal angle. With the center of curvature of the filter located on the optic axis, light impinging on the edges of the filter will experience less attenuation than light transmitted through the center of the filter, and with proper design of the filter curvature, a light intensity gradient can be established that compensates for the undesired gradient described previously.

As a practical matter, it is convenient to use a point light source on the optic axis in conjunction with a spherical interference filter having its center of curvature at the point source. In this location, the filter will give uniform transmission because all light rays will impinge at a normal angle; but, by subsequently moving the filter axially, gradually increasing transmission nonuniformities are produced to give gradual gradient compensation. By monitoring the light intensity gradient at the output of the optical system one can thereby locate the filter at a position giving optimum compensation.

The embodiment described above is particularly convenient for correcting symmetrical vignetting because the interference filter attenuation is symmetrical about the optic axis. However, nonsymmetrical gradients can likewise be produced by tilting the filter rather than by moving it axially. Nonuniform filter transmission can also be produced by constructing the filter from layers of nonuniform thickness, as well as other configurations that will be described later.

These and other objects, features and embodiments will be better understood from a consideration of the following detailed description taken in conjunction with the accompanying drawing.

2
DRAWING DESCRIPTION

DETAILED DESCRIPTION

Figure 1:
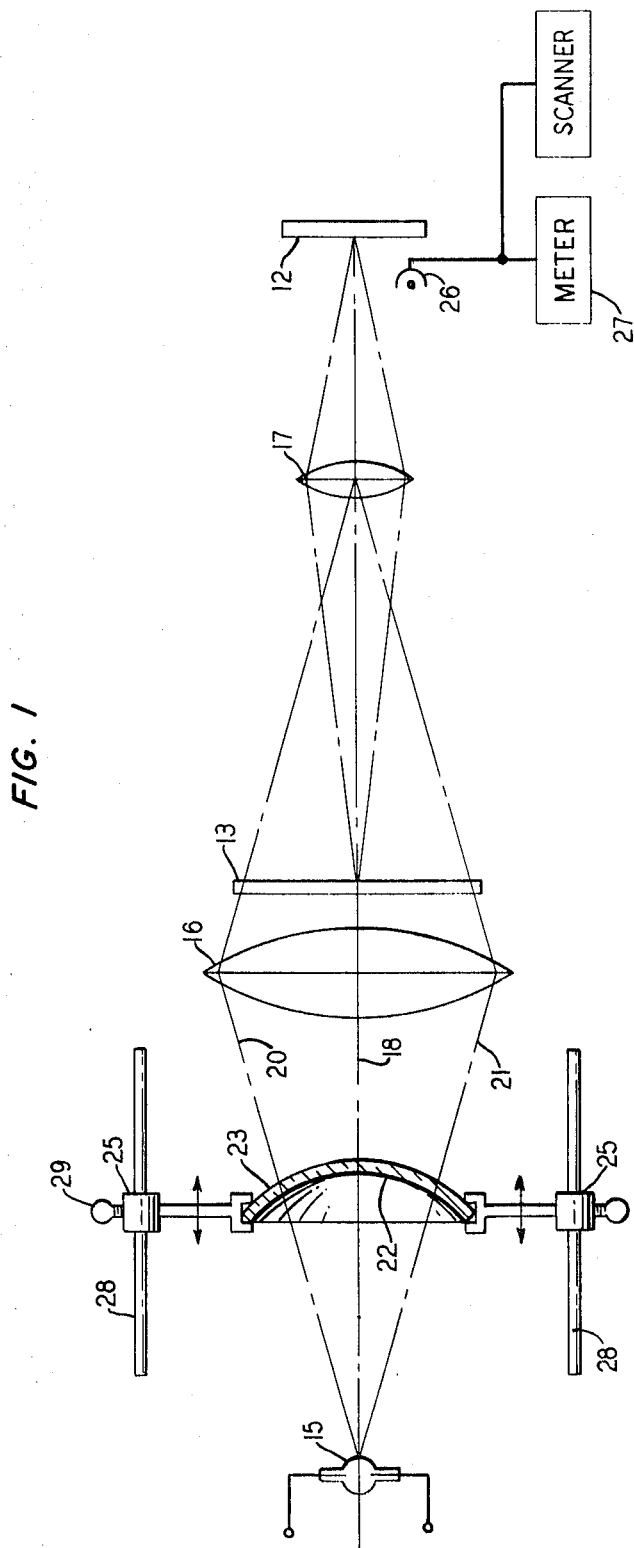
FIG. 1 is a schematic illustration of an optical system in accordance with an illustrative embodiment of the invention.

Referring now to FIG. 1, there is shown schematically an optical system that may be used for making on a photographic medium 12 a reduced-sized reproduction of a photolithographic mask 13. The system comprises a substantially monochromatic light source 15, a condensing lens 16 and a projection lens 17 arranged along an optic axis 18. Mask 13 is imaged on photographic medium 12, and after the medium has been developed, a reduced-size reproduction of the mask is produced. Source 15 may be a mercury-vapor lamp of a kind conventionally used in semiconductor photolithography processes.

The problem of vignetting averted to above results from the tendency of lenses 16 and 17, which are made by conventional techniques, to give a higher attenuation to rays transmitted near their peripheries than to rays transmitted along the optic axis; for example, light rays 20 and 21 are attenuated by the condensing lens to a greater extent than rays following the optic axis 18. In the absence of any compensation, this lens characteristic would give rise to an undesired light intensity gradient in a plane transverse to optic axis 18, with consequent nonuniform exposure of medium 12. Other optic elements in a high quality photographic reduction system, which for purposes of simplicity have not been shown, also contribute to the vignetting problem.

In accordance with the invention, compensation is made for undesired light intensity gradients by an interference filter 22 formed on a spherical transparent substrate 23. In the embodiment shown, the light source 15 is of sufficiently small area to constitute a point source on optic axis 18 and the interference filter 22 is spherical with its center of curvature at the point source.

The interference filter is designed to have a maximum transmission frequency which is slightly lower than the light source frequency. In the position shown, all light rays will be equally attenuated by the filter because they all impinge on the filter at a normal angle. The filter is, however, connected to sliding devices 25 which permits it to be moved and positioned axially. Three sliding devices 25 may be used each of which rides on a bar 28 and may be locked in position by a thumbscrew 29. As the filter is moved, for example, to the left, the angles at which edge rays 20 and 21 impinge on the filter become progressively more acute while the angle of impingement of the central ray remains normal; the increasingly acute impingement angle of the edge rays reduces their attenuation thus giving a higher light transmission at the edges than at the center of the filter. This produces a light intensity gradient which, through adjustment of the position of filter 22, may be made substantially equal and opposite to the undesired gradient produced by the lenses.

The location at which optimum compensation has been made may be determined, for example, by a photocell 26 which mechanically scans a plane transverse to the optic axis 18. A meter 27 of course permits monitoring of the light intensity gradient near the output plane, and its construction, along with that of the photocell 26 and an appropriate scanning mechanism, are within the skill of a worker in the art.

Figure 2:
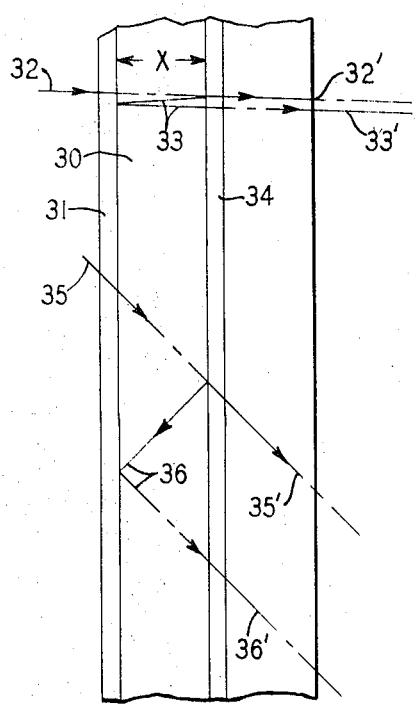
FIG. 2 is a schematic illustration showing the principles of operation of an interference filter.

The construction and operation of interference filters are known in the art, and as illustrated in FIG. 2, such a filter may comprise a transparent film 30 such as magnesium fluoride sandwiched between opposite partially reflecting layers 31 and 34 of a material such as silver. To appreciate the filtering properties and the effect of impingement angle, consider first a light ray 32 impinging normally or nearly normally on the partially transparent film 31. Part of the ray passes unimpeded as shown by ray 32', but part of it is also reflected by layer 34 back to layer 31 along path 33 and out through the filter as shown by ray 33'. Ray 33' will constructively interfere with ray 32' at those frequencies at which the thickness $x$ of the transparent film is an integral number of half wavelengths; for example, maximum constructive interference will occur at a frequency $f_1$ having a wavelength $\lambda$ equal to $2x$ because at that frequency, ray 33' will be in phase with ray 32'. Light of path 33 will be internally reflected by the filter many times, but if it is of the proper frequency $f_1$, each component transmitted through partially reflecting layer 32 will add in-phase with the other components. The filter is therefore characterized by a frequency pass-band shown by curve 37 of FIG. 3 which is centered about frequency $f_1$, its shape depending upon the parameters of the filter.

Consider next a ray 35 impinging on the filter at a 45° angle, part of which exits as ray 35'. The remainder is internally reflected as shown by ray path 36, a component of which leaves the filter as ray 36'. Simple geometry shows that the path length of ray 36' exceeds that of ray 35' by $\sqrt{2}x$. Hence, maximum constructive interference will occur at a frequency having a wave length of $\sqrt{2}x$, rather than $2x$, and the frequency pass-band shown in FIG. 3 will effectively be shifted to a higher frequency.

This discussion demonstrates that the interference filter 22 of FIG. 1 presents a higher frequency pass-band to rays impinging at an acute angle than to rays impinging at a normal angle.

Figure 3:
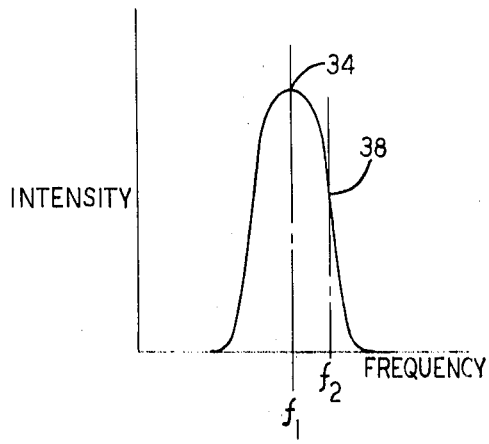
FIG. 3 is a graph showing the frequency pass-band of an interference filter.

In order, however, for the filter 22 of FIG. 1 to function as described, it is preferably constructed such that its maximum transmission frequency is lower than the source frequency. Referring to FIG. 3, $f_1$ may be considered the maximum transmission frequency of the filter at normal impingement, and $f_2$ the frequency of light radiating from source 15. Light impinging on the filter at a normal angle is therefore attenuated somewhat as shown by point 38 of curve 37. As the angle of impingement increases, however, the pass-band frequency of the filter is increased by the phenomenon described above, which results in a higher transmission and lower attenuation at the source frequency $f_2$.

Figure 4:
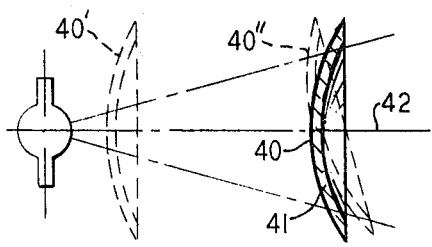
FIG. 4 is a chematic illustration of an interference filter in accordance with another embodiment of the invention.

In the FIG. 1 embodiment, our technique involves the use of an interference filter to create a light intensity gradient that is optimally equal and opposite to the undesired gradient for which compensation is desired. It is clear that one way to produce different gradients would be to use different filter configurations. For example, in the embodiment of FIG. 4, the filter 40 is formed on the outer surface of a curved substrate 41 to again produce a gradient that is symmetrical with respect to an optic axis 42. The gradient, however, would be significantly less pronounced as the filter is moved to position 40' shown in phantom, because at this location all rays impinge at a more nearly equal angle. The filter may also be tilted with respect to the axis as shown by position 40" to produce a nonsymmetrical gradient.

Figure 5:
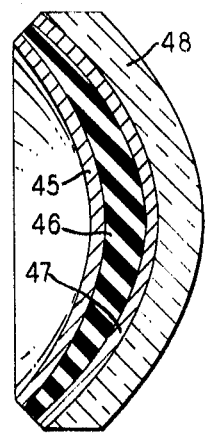
FIG. 5 is a schematic illustration of an interference filter in accordance with still another embodiment of the invention.

The interference filter may conveniently be formed on a glass substrate by consecutively evaporating the thin films illustrated schematically in FIG. 2. If these films are evaporated on substrate 23 of FIG. 1 from a point at the center of curvature of the substrate, they can conveniently be made to be of substantially uniform thickness. It is not necessary, however, that the layers be of uniform thickness or that they form a spherical filter. For example, in the highly distorted view of FIG. 5, an interference filter comprises layers 45, 46, and 47 deposited on a substantially parabolic transparent substrate 48. Moreover, the thickness of transparent layer 46, which determines the frequency pass-band, is made variable instead of uniform. This can conveniently be accomplished by locating the evaporation source somewhat nearer the center of the substrate than its periphery, which results in a slightly thicker layer near the center and lower frequency pass-band than at the edge. Moreover, the parabolic configuration tends to increase angular differences as compared to a spherical or circular configuration. Whereas the filter 22 of FIG. 1 gives differential attenuation only when it is moved axially from the position shown, the filter of FIG. 5 would give differential attenuation even if it were located at that identical position. Hence, the filter of FIG. 5 may initially be fabricated to give substantial compensation and then moved axially as shown in FIG. 1 to give a fine adjustment of the output gradient.

It is to be understood that various configurations other than those specifically described may alternatively be used to advantage. For example, it is quite convenient to provide differential attenuation in a converging light beam rather than in a diverging beam as has been described. Other interference filter structures may be used such as the "all-dielectric" filter which comprises several alternate layers of materials of different refractive index such as magnesium fluoride and zinc sulfide. Interference filters may have broad pass-bands of relatively high or low frequency as well as narrow pass-bands. Various other embodiments and modifications can be made by those skilled in the art without departing from the spirit and scope of the invention.

We claim:

1. In a system in which light of predominantly a single frequency is projected along a path, apparatus for adjusting the relative distribution of projected light comprising:
    an interference filter at least part of which has a pass-band which includes said predominant frequency;
    said interference filter being located in the path such that the direction at which different component rays of said light impinge on the filter are different, thereby to change the light intensity gradient at the predominant frequency in a plane transverse to the path.

2. The system of claim 1 wherein:
    the component rays of said light are nonparallel.

3. The system of claim 1 further comprising:
    means for moving the interference filter relative to to the path.

4. The system of claim 3 further comprising:
    means for monitoring the light intensity gradient as the interference filter is moved.

5. The system of claim 3 wherein:
    said filter has a maximum transmission frequency which is removed from said predominant frequency.

6. The system of claim 5 wherein:
    the interference filter comprises opposite surfaces between which partial light reflection may occur;
    said surfaces being curved.

7. The system of claim 6 wherein:
    the distance between said opposite surfaces is substantially uniform, whereby the frequency pass-band of the filter at a given impingement angle is substantially uniform.

8. The system of claim 7 wherein:
    the component rays of the light are nonparallel;
    and the moving means comprises means for moving the filter in the direction of the optic axis.

9. The system of claim 8 wherein:
    said light is projected substantially from a point on the optic axis;
    and the filter is a spherical filter having its center of curvature at said point.

10. In a system comprising means for projecting light along an optic axis and a plurality of optic elements arranged along the axis, apparatus for compensating for undesired nonuniform transmission by the optic elements comprising:
    a curved interference filter located on the optic axis;
    and means for moving the interference filter thereby to adjust relative light transmission therethrough.

11. The apparatus of claim 10 wherein:
    the component rays of the light are nonparallel;
    and the moving means comprises means for moving the filter axially.

12. The apparatus of claim 11 wherein:

the undesired transmission nonuniformities of the optic elements are substantially symmetrical with respect to the optic axis;

and the curvature of the filter is substantially symmetrical with respect to the optic axis.

13. In a system comprising a plurality of optic elements arranged along an optic axis, the method for adjusting the intensity gradient of light in a plane transverse to the optic axis comprising the steps of:

causing substantially monochromatic light to be emitted substantially radially from a point on the optic axis;

forming a spherical interference filter;

locating the interference filter along the optic axis with its center of curvature at said point, whereby light is substantially uniformly transmitted through the interference filter;

and moving the interference filter to adjust the intensity of light transmission therethrough.

14. Optical apparatus comprising:

a source of rays of light of a substantially single frequency;

at least one optical lens, said lens not being a perfect transmitter of light, and therefore, when illuminated by light of a given intensity and substantially single frequency, a gradient of light intensity is transmitted; and means for compensating said lens comprising an interference filter located in the path of said rays of light such that the angles formed by said rays of light with said interference filter are different thereby resulting in the transmission through said interference filter of a light intensity gradient which compensates for said light intensity gradient created by said lens.

15. The optical apparatus of claim 14 wherein said interference filter comprises opposite surfaces between which partial light reflect may occur.